United States Patent [19]

Ohgane

[11] Patent Number: 5,673,296
[45] Date of Patent: Sep. 30, 1997

[54] FRAME SYNCHRONIZATION CIRCUIT FOR DIGITAL COMMUNICATION SYSTEM

[75] Inventor: Shoji Ohgane, Tokyo, Japan

[73] Assignee: NEC Corporation, Tokyo, Japan

[21] Appl. No.: 701,532

[22] Filed: Aug. 26, 1996

Related U.S. Application Data

[63] Continuation of Ser. No. 239,840, May 9, 1994, abandoned, which is a continuation of Ser. No. 41,966, Apr. 2, 1993, abandoned.

[30] Foreign Application Priority Data

Apr. 2, 1992 [JP] Japan ................................ 4-080205

[51] Int. Cl.$^6$ ................................................. H04L 7/00
[52] U.S. Cl. ............................................ 375/368; 370/512
[58] Field of Search ......................... 375/368, 363, 375/364, 365, 366; 327/141; 370/509, 512, 513, 514, 520

[56] References Cited

FOREIGN PATENT DOCUMENTS

| | | |
|---|---|---|
| 1219977 | 3/1987 | Canada. |
| 0405761 | 1/1991 | European Pat. Off.. |

OTHER PUBLICATIONS

IEEE Transactions on Communications, vol. 33, No. 5, 1 May 1985, pp. 465–469, David E. Dodds, "Robust frame synchronisation for noisy pcm systems".

Primary Examiner—Stephen Chin
Assistant Examiner—Hai H. Phan
Attorney, Agent, or Firm—Sughrue, Mion, Zinn, Macpeak and Seas

[57] ABSTRACT

A frame synchronization circuit which detects a frame synchronization bit allotted in a particular position within a receiving data string includes a shift register, a synchronization pattern detection circuit and a control circuit. The shift register receives and stores the receiving data string and outputs a parallel data string. The synchronization pattern detection circuit receives the parallel data string outputted from the shift register in synchronization with a clock signal and makes decisions simultaneously on the matching/non-matching of a parallel data string of totally r bits disposed in an n bit cycle within the receiving data string with r kinds of predetermined synchronization patterns of r bits. The control circuit receives an output of the synchronization pattern detection circuit, and outputs either a signal indicative of the in-synchronization state through a terminal or a signal indicative of the out-of-synchronization state through a terminal. This enhances the synchronization reset characteristics and reduces the worst average synchronization reset time.

4 Claims, 4 Drawing Sheets

FRAME SYNCHRONIZATION CIRCUIT FOR DIGITAL COMMUNICATION SYSTEM

This is a Continuation of application Ser. No. 08/239,840 filed May 9, 1994, now abandoned, which is a Continuation of application Ser. No. 08/041,966 filed Apr. 2, 1993, now abandoned.

BACKGROUND OF THE INVENTION

(1) Field of the Invention

The present invention relates to a frame synchronization circuit, and more particularly to a frame synchronization circuit which is utilized for detecting a frame synchronization bit disposed at a particular position within a frame in performing a digital communication.

(2) Description of the Related Art

A digital communication requires a frame synchronization technique for recognizing a location of a given frame. As an example of a frame structure in the digital communication, an ISDN (Integrated Services Digital Network) primary rate interface is shown in FIG. 6. In the ISDN primary rate interface, one frame consists of 193 bits and the first bit is called "F-bit". Those bits from a second bit to a 193rd bit are data bits and there are 24 time slots each consisting of 8 bits. One frame is transmitted/received in a cycle of 125 μs and 24 frames as a unit constitutes a multi-frame. Within 24 F-bits of the multi-frame, the respective F-bits (6 bits) of 4th, 8th, 12th, 16th, 20th and 24th frames are regulated as a frame synchronization pattern of "001011". The respective F-bits (6 bits) of 2nd, 6th, 10th, 14th, 18th and 22nd frames are CRC (Cyclic Redundancy Check) bits for monitoring code errors of the interface and protecting against frame synchronization errors, and the respective F-bits (12 bits) of odd number frames are maintenance and operation data bits which are called "m-bits".

Thus, In the ISDN primary rate interface in which, within the 4632 bits (=198×24), a synchronization bit of the synchronization bit pattern of "001011" is inserted in every 772 (=193 ×4) bits, it is important that the frame synchronization is performed by the detection of this synchronization bit pattern. An example of a conventional circuit which takes into account the frame structure of the ISDN primary rate interface and the operation thereof are explained hereunder.

As conventional frame synchronization systems, those known include a one-bit shift system or a multi-point supervising system in which such one-bit shift system is applied. As an example of the conventional frame synchronization systems, FIG. 1 shows in block diagram an arrangement in which a system of multi-point supervising type is utilized.

The conventional frame synchronization circuit shown in FIG. 1 is formed by a shift register 28, an AND circuit 24, a counter 25, a synchronization pattern generation circuit 26, a comparator circuit 27 and a control circuit 28. The shift register 23 of 3860 (=772×5) bits receives an input data from a data input terminal 62 and a clock signal from a clock input terminal 63. The AND circuit 24 performs a logical AND operation on the clock signal from the clock input terminal 63 and an output Y issued from the control circuit 28. The counter 25 divides the clock signal outputted from the AND circuit 24 into 1/772. The synchronization pattern generation circuit 26 outputs a synchronization pattern in synchronization with the output from the counter 25. The comparator circuit 27 receives and compares the output of the shift register 23 and the output of the synchronization pattern generation circuit 26. The control circuit 28 receives an output X of the comparator circuit 27 and decides whether it is "in-synchronization" or "out-of-synchronization". The signal indicative of the in-synchronization state is outputted from one terminal 64 while that indicative of the out-of-synchronization state is outputted from the other terminal 65.

FIG. 2 shows in block diagram an internal structure of the shift register 23, in which there are an input terminal 66, six output terminals 67–72 and five 772-bits shift registers 29–33 respectively corresponding to the output terminals 68–72. FIG. 3 shows in block diagram an internal structure of the synchronization pattern generation circuit 26, in which there is a 6-bits shift register 34 connected to pre-set terminals 73–78 and output terminals 79–84.

In the arrangement shown in FIG. 1, the data inputted from the data input terminal 62 is inputted to and stored at the shift register 23, and is outputted from the output terminals 67–72 in every 772 bits as a parallel signal of a unit of 6 bits. This parallel signal of 6 bits outputted from the shift register 23 is then inputted to the comparator circuit 27 and compared with the frame synchronization pattern outputted from the synchronization pattern generation circuit 26. In FIG. 3, assuming that, as an initial state, the synchronization pattern generation circuit 26 is set to the synchronization pattern of "001011" through the pre-set terminals 73–78, this pattern is phase-shifted one bit at a time in synchronization with a clock signal, in such a way as "100101", "110010", "011001", "101100" and "010110". Such patterns are respectively outputted from the output terminals 79–84.

At the comparator circuit 27, if the frame synchronization pattern outputted from the synchronization pattern generation circuit 26 does not match the frame pattern of the data received, then the comparison is made between the next data received and the synchronization pattern. Here, the output Y of the control circuit 28 is OFF and, thus, the clock signal which is supplied to the AND circuit 24 from the clock input terminal 63 is not supplied to the counter 25 through this AND circuit 24. Therefore, the output terminal 64 takes an OFF state indicative of the in-synchronization state while the output terminal 65 takes an ON state indicative of the out-of-synchronization state. This state continues until the matching between the input data pattern and the synchronization pattern takes place. When the comparison results in the matching of the synchronization pattern, the output Y of the control circuit 28 becomes ON and, with the gate of the AND circuit 24 being opened, the clock signal received from the clock input terminal 63 is supplied to the counter 25. In this way, at the control circuit 28, the output terminal 64 turns to ON state indicative of the in-synchronization state and the output terminal 65 turns to an OFF state indicative of the out-of-synchronization state. The counter 25 supplies one clock to the synchronization pattern generation circuit 26 when it counted the received clocks up to 772 clocks. In response to this one clock, the synchronization pattern generation circuit 26 produces the next synchronization pattern and forwards the same to the comparator 27. The comparator circuit 27 compares the present data, that is, the receiving data after 772 bits from the receiving data having been compared and decided the last time, with the synchronization pattern mentioned above and the result of this comparison is inputted to the control circuit 28. If this second comparison results in the matching of the receiving data and the synchronization pattern, the same operation is repeated.

The most important among the characteristics of such frame synchronization circuit is a synchronization reset characteristic. As a parameter for this synchronization reset characteristic, the worst average synchronization reset time is available, which may be expressed by the following equation:

$$T_S = [1 + \{P(N-1)/R(1-P)\}]T_F \qquad (1)$$

wherein $T_S$ is the worst average synchronization reset time, P is a probability of the synchronization pattern matching with the bit string to be compared, N is the total number of bits within the frame, R is a length of the frame synchronization pattern, and $T_F$ is a frame cycle. When this equation is applied to the conventional example, $P=(\frac{1}{2})^n$, N=4632, R=6, $T_F$=3 ms and the calculated worst average synchronization reset time $T_S$ is $T_S$=39.75 ms.

The foregoing has explained the operation of the conventional frame synchronization circuit. In a frame synchronization circuit generally used, it is important for the circuit to have a good holding characteristic, that is, there should be no likelihood for the out-of-synchronization to occur due to disturbances such as transmission code errors. In order to ensure this, it is important for the circuit to have front and back protection functions. In the back protection function, even when the receiving data and the frame synchronization pattern match each other, this is not immediately recognized as being the in-synchronization state but is so recognized only after the number of times of the matching exceeds a certain value (protection stage number). Similarly, in the front protection function, even when the non-matching is detected under the synchronization state, this is not immediately recognized as being the out-of-synchronization state but is recognized only after the number of times of the non-matching exceeds a certain value (protection stage number). In the conventional example shown in FIG. 1, counters corresponding to the number of protection stages are provided in the control circuit 28 and this makes it possible for the frame synchronization circuit to have the front and back protection functions.

In the conventional frame synchronization circuit explained above, the synchronization reset characteristic which is critical to the frame synchronization circuit is bad. For example, in the case of the ISDN primary rate interface, whereas it is regulated that the worst average synchronization reset time should not exceed 15 ms, the conventional frame synchronization circuit has been unable to satisfy such regulation and the worst average synchronization reset time which is the parameter for indicating the synchronization reset characteristic has been prolonged and this has been a problem in the conventional frame synchronization circuit.

SUMMARY OF THE INVENTION

It is, therefore, an object of the invention to overcome the problem existing in the conventional frame synchronization circuit and to provide an improved frame synchronization circuit in which the worst average synchronization reset time is effectively shortened.

According to one aspect of the invention, there is provided a frame synchronization circuit which detects frame synchronization bits allotted in particular positions within a receiving data string, the frame synchronization circuit comprising:

a shift register which receives and stores the receiving data string; and a synchronization pattern detection circuit which receives the receiving data string outputted in a parallel form from the shift register in synchronization with a clock signal and makes decisions simultaneously on matching/non-matching between a parallel data string of totally r (r being an integer larger than 0) bits disposed in an n (n being an integer larger than 0) bit cycle within the receiving data string and r kinds of predetermined synchronization patterns of r bits.

BRIEF DESCRIPTION OF THE DRAWINGS

The above and other objects, features and advantages of the present invention will be apparent from the following description of preferred embodiments of the invention explained with reference to the accompanying drawings, in which.

DESCRIPTION OF THE PREFERRED EMBODIMENT

Now, the present invention is explained with reference to the accompanying drawings.

Figure 1:
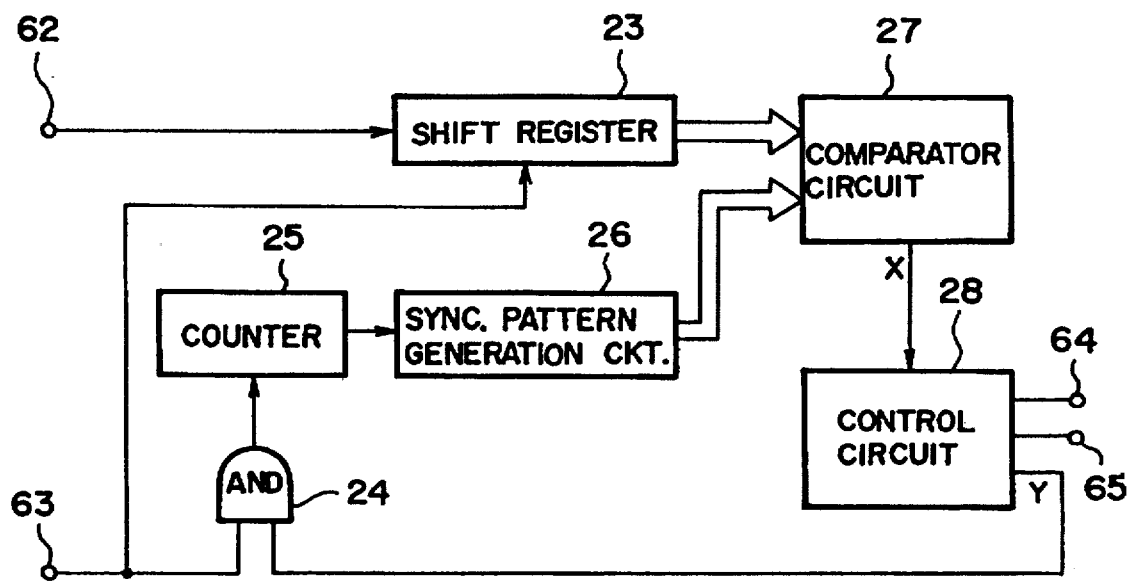
FIG. 1 is a block diagram of a conventional frame synchronization circuit.
Figure 2:
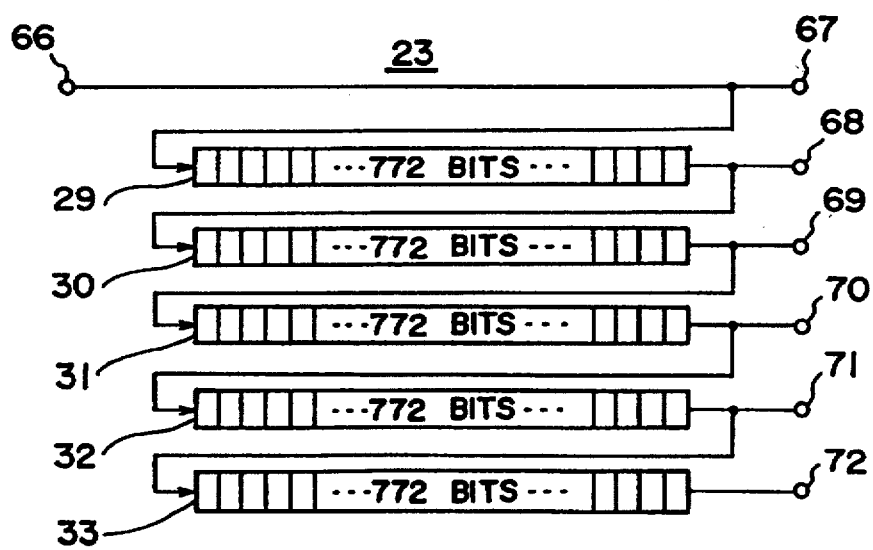
FIG. 2 is a block diagram of a shift register shown in FIG. 1.
Figure 3:
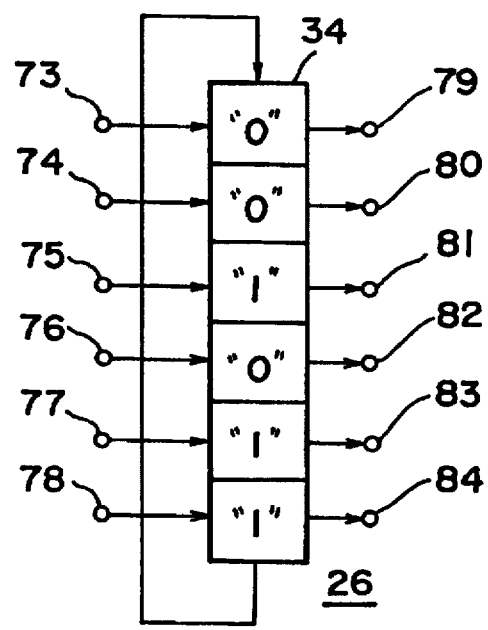
FIG. 3 is a block diagram of a synchronization pattern generation circuit shown in FIG. 1.
Figure 4:
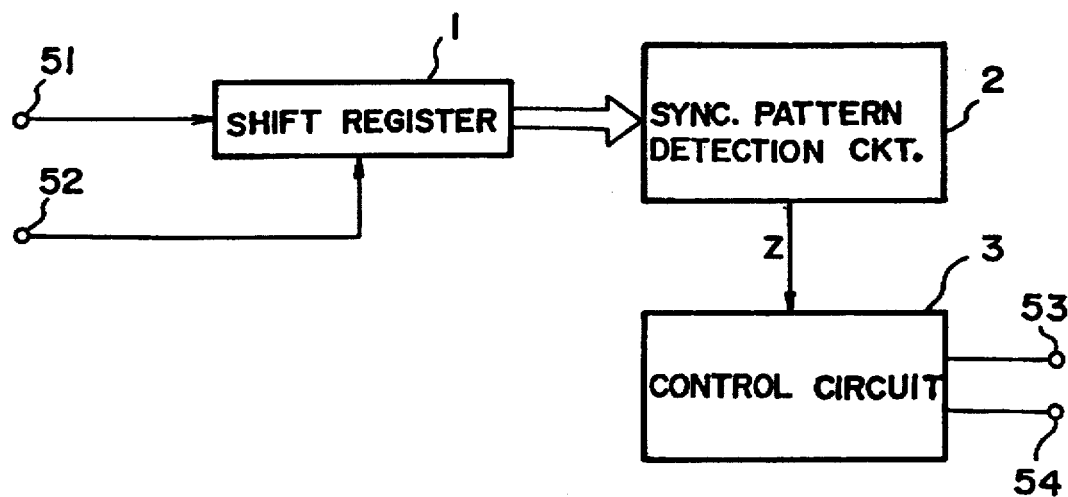
FIG. 4 is a block diagram of a frame synchronization circuit according to the present invention.
Figure 5:
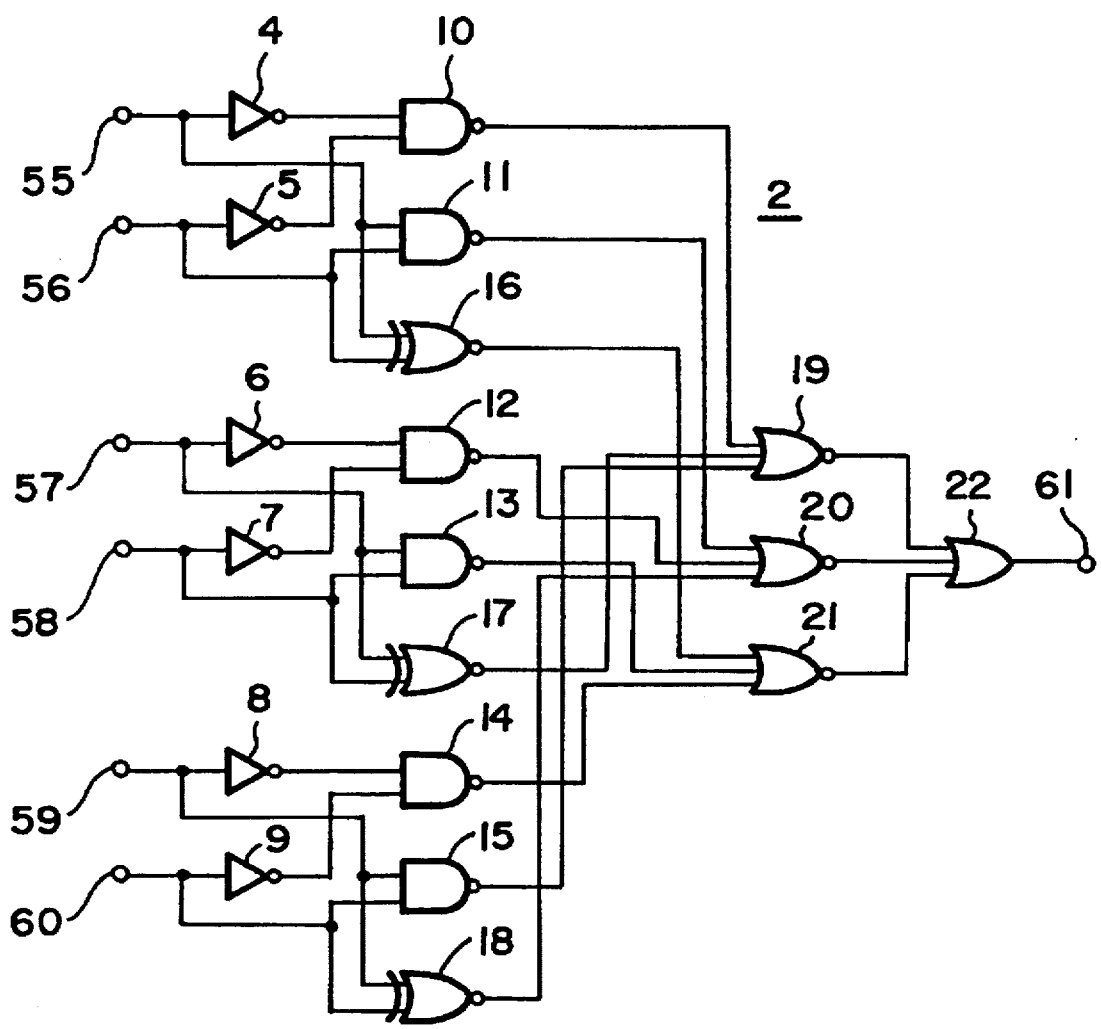
FIG. 5 is a circuit diagram of a synchronization pattern generation circuit shown in FIG. 4.
Figure 6:
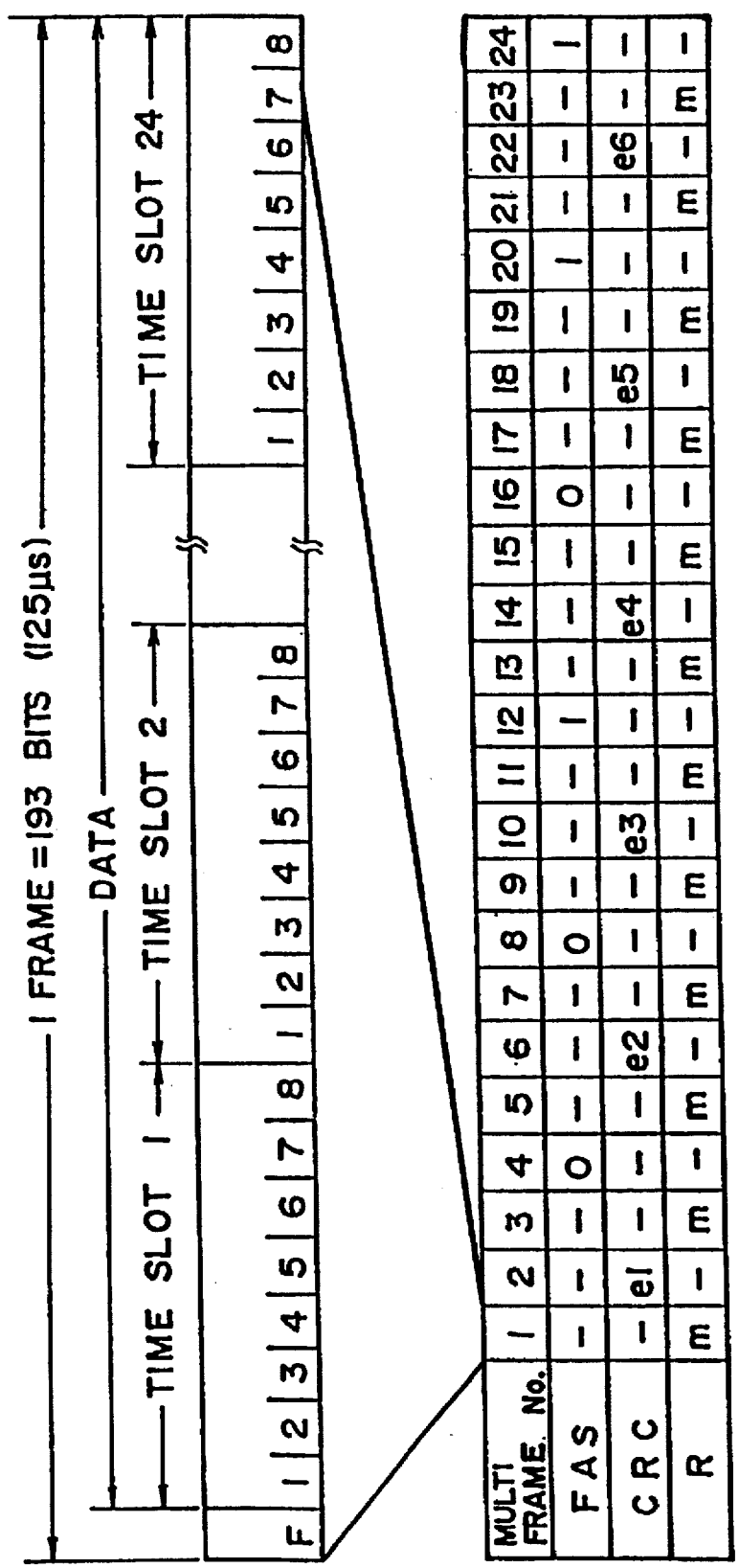
FIG. 6 is a diagram showing a frame structure of an ISDN primary rate interface.

FIG. 4 is a block diagram showing an embodiment of the present invention. As shown in FIG. 4, the frame synchronization circuit of this embodiment comprises a shift register 1 which stores a data string inputted to a data input terminal 51 in synchronization with a clock signal inputted to a clock input terminal 52; a synchronization pattern detection circuit 2 which receives an output of the shift register 1; and a control circuit 3 which receives an output Z of the synchronization pattern detection circuit 2, decides whether the received output Z is in-synchronization or out-of-synchronization, and outputs either a signal indicative of the in-synchronization state through a terminal 53 or a signal indicative of the out-of-synchronization state through a terminal 54. The shift register 1 is the same as the shift register 23 in the conventional circuit shown in FIG. 1, and the detail thereof is shown in FIG. 2. FIG. 5 is a detailed circuit diagram showing an internal structure of the synchronization pattern detection circuit 2.

The synchronization pattern detection circuit 2 exemplified in FIG. 5 comprises, correspondingly with six input terminals 55–60 and one output terminal 61, six inverters 4–9, six NAND circuits 10–15, three Exclusive NOR circuits 16–18, three NOR circuits 19–21, and one OR circuit 22.

In FIG. 5, assuming that the receiving data corresponding to the synchronization pattern of "001011" is inputted to the input terminals 55–60, the outputs of the inverters 4 and 5 both become "1" and, thus, the output of the NAND circuit 10 becomes "0". Also, the NAND circuit 11 outputs "1" and the Exclusive NOR circuit 16 outputs "1". The output of the inverter 6 becomes "0", the output of the inverter 7 becomes "1" and, thus, the output of the NAND circuit 12 becomes "1". Also, the NAND circuit 13 outputs "1" and the Exclusive NOR circuit 17 outputs "0". The outputs of the inverters 8 and 9 both become "0" and, thus, the output of the NAND circuit 14 becomes "1". Also, the NAND circuit 15 outputs "0" and the Exclusive NOR circuit 18 outputs "1". Then, as the output "0" of the NAND circuit 10, the output "0" of the Exclusive NOR circuit 17 and the output "0" of the NAND circuit 15 are inputted to the NOR circuit 19, this NOR circuit 19 outputs "1". The NOR circuits 20 and 21 both output "0". As a result, the OR circuit 22 outputs "1" to the output terminal 61 as a signal indicative of the matching of the receiving data with respect to the synchronization pattern.

Even when any of "100101", "110010", "011001", "101100" and "010110" is inputted to the input terminals 55–60 as the receiving data, the output to the output terminal 61 is in all cases "1" as a signal indicative of the matching between the receiving data and the synchronization pattern. On the other hand, when a receiving data other than the above six kinds of synchronization patterns is inputted, the output to the output terminal 61 is "0" indicative of the non-matching of the receiving data with respect to the synchronization pattern.

In FIG. 4, the data inputted from the data input terminal 51 and outputted as the receiving data of 6 bits from the shift register 1 with intervals of 772 bits are parallely inputted to the input terminal 55–60 of the synchronization pattern detection circuit 2. Here, the six output terminals 67–72 (in FIG. 2) of the shift register 1 correspond respectively to the input terminals 55–60 of the synchronization pattern detection circuit 2. When the receiving data of 6 bits outputted from the shift register 1 matches the synchronization pattern of "001011" or any of the synchronization patterns "100101", "110010", "011001", "101100" and "010110" in which one bit each is sequentially shifted, the output from the output terminal 61 (in FIG. 5) is "1" as an output signal Z for indicating the matching and is inputted to the control circuit 3. In this case, in the control circuit 3, the output terminal 53 takes the ON state which indicates the in-synchronization state and the output terminal 54 takes the OFF state which indicates the out-of-synchronization state. Under the states of non-matching with any of the above mentioned six synchronization patterns, the output from the output terminal 61 of the synchronization pattern detection circuit 2 is "0" and the signal Z of "0" is inputted to the control circuit 3. In this case, the output terminal 53 takes the OFF state which indicates the in-synchronization state and the output terminal 54 takes the ON state which indicates the out-of-synchronization state.

In the conventional frame synchronization circuit, even in the worst case, where the matching/non-matching decisions have been made 4631 times, the matching with the synchronization pattern must take place in the next turn. Therefore, the worst average synchronization reset time is an expected value of the time required for making 4631 times of the matching/non-matching decisions and the value of this time is 39.75 ms from the equation (1) given earlier. However, in the frame synchronization circuit according to the invention, even in the worst case, where the matching/non-matching decisions have been made 771 times, the matching with one of the six synchronization patterns must take place in the next turn. Therefore, the worst average synchronization reset time is an expected value of the time required for making 771 times of the matching/non-matching decisions and the value of this time is ⅙ of 39.75 ms, which is about 6.6 ms accordingly. Thus, the value of the worst average synchronization reset time has been remarkably reduced.

In other examples or applications, the synchronization pattern detection circuit 2 may be constituted by a PLA (Programmable Logic Array) or may be realized by using other means such as a ROM (Read Only Memory).

As explained above, according to the invention, the frame synchronization circuit comprises a shift register which stores the receiving data string, and a synchronization pattern detection circuit which makes decisions simultaneously on the matching/non-matching of a data string of totally r bits disposed in an n bits cycle within the receiving data string stored in the shift register with r kinds of predetermined synchronization patterns of r bits. This enhances the synchronization reset characteristics and reduces the worst average synchronization reset time effectively.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A frame synchronization circuit for use in an ISDN (Integrated Services Digital Network) primary rate interface, for detecting frame synchronization bits allotted in particular positions within a receiving data string, said frame synchronization circuit comprising:

a shift register which receives and stores said receiving data string, and then outputs a parallel data string of 6 bits disposed in a 772 bit cycle within the receiving data string; and a synchronization pattern detection circuit which receives said parallel data string output from said shift register in synchronization with a clock signal and makes decisions simultaneously or at one time on matching/non-matching between said parallel data string of 6 bits and any one of 6 kinds of predetermined synchronization patterns of 6 bits, said 6 kinds of predetermined synchronization patterns having been established in advance in said synchronization pattern detection circuit;

said synchronization pattern detection circuit comprising:

a plurality inverters, each of which is coupled to receive one bit of said parallel data string of 6 bits;

a plurality of NAND gates, each of which having a plurality of inputs, one of said inputs being coupled to an output of one of said inverters or to receive one bit of said parallel data string of 6 bits, and another of said inputs being coupled to an output of one of the inverters or to receive one bit of said parallel data string of 6 bits;

a plurality of Exclusive NOR gates, each having two inputs, each of said inputs being coupled to receive one bit of said parallel data string of 6 bits;

a plurality of NOR gates, each of which having a plurality of inputs, each of said inputs receiving an output of one of said NAND gates or an output of one of said Exclusive NOR gates; and an OR gate having a plurality of inputs, each for receiving an output of said NOR gates, and having an output for outputting an output indicating matching or non-matching between said parallel data string of 6 bits and said any one of six kinds of predetermined synchronization patterns of 6 bits.

2. A frame synchronization circuit according to claim 1, further comprising a control circuit which has a first and a second terminal and which receives an output of the synchronization pattern detection circuit, decides whether the received output is in-synchronization or out-of-synchronization, and outputs either a signal indicative of an in-synchronization state through said first terminal or a signal indicative of an out-of-synchronization state through said second terminal.

3. A frame synchronization circuit according to claim 1, in which said shift register is formed by five 772-bit shift registers connected in series.

4. A frame synchronization circuit as claimed in claim 1, wherein said synchronization pattern detection circuit comprises six of said inverters, six of said NAND gates, three of said Exclusive NOR gates, and three of said NOR gates.

* * * * *